US011301440B2

(12) United States Patent
Camper

(10) Patent No.: US 11,301,440 B2
(45) Date of Patent: Apr. 12, 2022

(54) FUZZY SEARCH USING FIELD-LEVEL DELETION NEIGHBORHOODS

(71) Applicant: LexisNexis Risk Solutions, Inc., Alpharetta, GA (US)

(72) Inventor: Daniel Scott Camper, Cedar Park, TX (US)

(73) Assignee: LexisNexis Risk Solutions, Inc., Alpharetta, GA (US)

( * ) Notice: Subject to any disclaimer, the term of this patent is extended or adjusted under 35 U.S.C. 154(b) by 27 days.

(21) Appl. No.: 16/904,921

(22) Filed: Jun. 18, 2020

(65) Prior Publication Data
US 2021/0397591 A1    Dec. 23, 2021

(51) Int. Cl.
*G06F 16/00* (2019.01)
*G06F 16/215* (2019.01)
(Continued)

(52) U.S. Cl.
CPC ........ *G06F 16/215* (2019.01); *G06F 16/2255* (2019.01); *G06F 16/2365* (2019.01); *G06F 16/285* (2019.01); *G06F 16/288* (2019.01)

(58) Field of Classification Search
CPC .. G06F 16/215; G06F 16/1748; G06F 16/285; G06F 3/0641; G06F 11/1453;
(Continued)

(56) References Cited

U.S. PATENT DOCUMENTS

| 7,516,149 B2 | 4/2009 | Motwani et al. |
| 7,720,846 B1 * | 5/2010 | Bayliss ................. G06F 16/285 707/736 |

(Continued)

OTHER PUBLICATIONS

Thomas Bocek, Ela Hunt, Burkhard Stiller, Fast Similarity Search in Large Dictionaries, University of Zurich Department of Informatics Technical Report, Apr. 2007, 32 pages, Zürich, Switzerland.

(Continued)

*Primary Examiner* — Shyue Jiunn Hwa
(74) *Attorney, Agent, or Firm* — Troutman Pepper Hamilton Sanders LLP; James E. Schutz; Mark Lehi Jones

(57) ABSTRACT

The disclosure provides an efficient dataset search and/or deduplication that improve the speed and efficiency of dataset record search and/or deduplication over traditional methods. Certain implementations apply field-level deletion neighborhood processing to ordered field permutations of dataset records encoded with hash values. A method includes determining a field-level deletion neighborhood for two or more field combinations of the record by determining field hash values, creating field permutations, determining combined record hash values for each permutation; and associating each record hash value to the unique entity identifier. The method includes searching other entity representation records for matching combined record hash values, and assigning one or more of a unique entity identifier and a duplicate entity identifier to the other entity representation records having the matching combined record hash values. Certain implementations can include removing, from the database, at least one of the other entity representation records having a duplicate record identifier.

16 Claims, 10 Drawing Sheets

(51) Int. Cl.
*G06F 16/22* (2019.01)
*G06F 16/23* (2019.01)
*G06F 16/28* (2019.01)

(58) Field of Classification Search
CPC .... G06F 16/137; G06F 3/04842; G06F 16/29;
G06F 3/0482; G06F 16/332; G06F
16/3322; G06F 16/48; G06F 16/532;
G06F 16/54; G06F 16/58; G06F 16/9024;
G06F 16/9537; G06F 8/61; G06F 8/65
See application file for complete search history.

(56) References Cited

U.S. PATENT DOCUMENTS

| | | | | |
|---|---|---|---|---|
| 10,152,479 | B1* | 12/2018 | Granstrom | G06F 16/483 |
| 10,838,923 | B1* | 11/2020 | Menezes | G06F 16/2365 |
| 2010/0005048 | A1 | 1/2010 | Bodapati et al. | |
| 2014/0007238 | A1* | 1/2014 | Magee | H04L 63/1408 726/24 |
| 2018/0203917 | A1 | 7/2018 | Marshall et al. | |
| 2019/0236102 | A1* | 8/2019 | Wade | G06F 40/137 |

OTHER PUBLICATIONS

Ahmed K. Elmagarmid, Panagiotis G. Ipeirotis, Vassilios S. Verykios, Duplicate Record Detection: A Survey, Jan. 2007, 16 pages, vol. 19, No. 1, EEE Transactions on Knowledge and Data Engineering.

Daniel Karch, Dennis Luxen, Peter Sanders, Improved Fast Similarity Search in Dictionaries, Aug. 18, 2020, 13 pages, Karlsruhe Institute of Technology.

Loic Pauleve, Herve Jegou, Laurent Amsaleg, Locality sensitive hashing: a comparison of hash function types and querying mechanisms, Apr. 2010, 13 pages, Pattern Recognition Letters.

Jingdong Wang, Heng Tao Shen, Jingkuan Song, Jianqiu Ji, Hashing for Similarity Search: A Survey, Aug. 14, 2014, 29 pages.

Thomas Bocek et al., Fast Similarity Search in Large Dictionaries, University of Zurich, Department of Informatics, Technical Report, Apr. 2007, 32 pages, Binzmiihlestrasse 14, CH-8050 Zurich, Switzerland.

European Search Report and Written Opinion dated Sep. 30, 2021 issued in European Application No. 21169714.

* cited by examiner

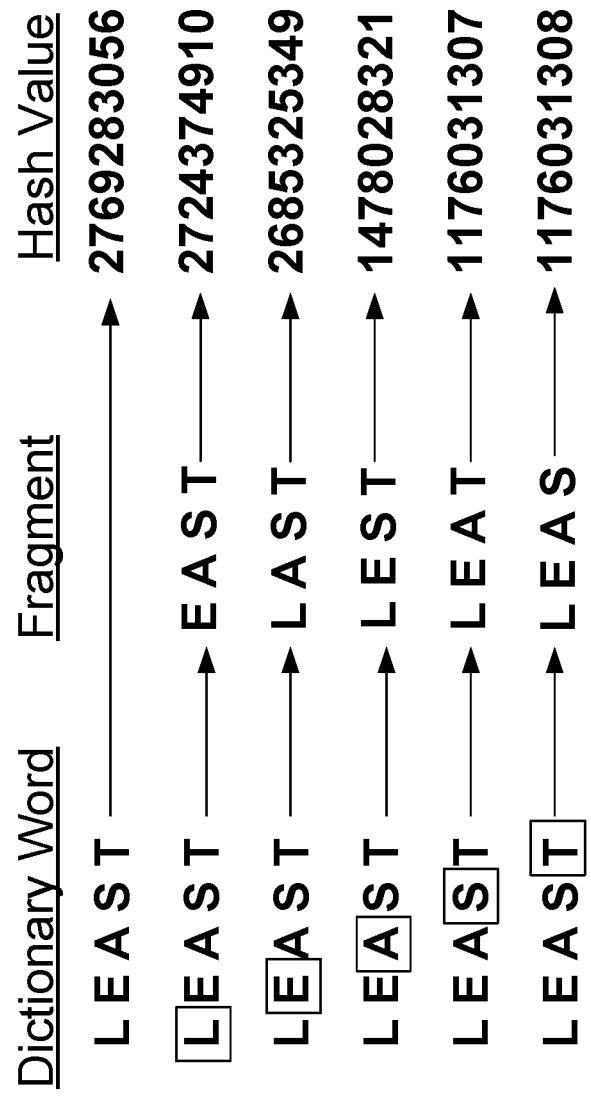

DELETION NEIGHBORHOOD
-- Processing Speed Improvements --

| Total number of records | Query Type | Search Fields | Brute Force Total Time | Deletion Neighborhood Total Time | Speed Improvement |
|---|---|---|---|---|---|
| 4.5 million | Search | 1 | 0.478 s | 0.007 s | 68 x |
| 46 million | Search | 1 | 4.118 s | 0.017 s | 242 x |
| 370,000 | Bulk Matching | 7,300 | 258 s | 0.73 s | 353 x |
| 370,000 | Bulk Matching | 73,000 | 2503 s | 6.45 s | 388 x |

FUZZY SEARCH USING FIELD-LEVEL DELETION NEIGHBORHOODS

BACKGROUND

The challenge of building and maintaining error-free datasets often involves searching for and removing duplicate records. The problem of detection and elimination of duplicate database records is one of the major problems in the broad area of data cleansing and data quality. A single real-world entity may be listed multiple times in a database under different records due to variations in spelling, field formats, etc. An entity listing with an address of "25 W. 6$^{th}$ St.," for example, may also be duplicated in another record of the database under the address of "25 West Sixth Street." Such duplicate records can create unnecessary expenses, erroneous updates, and inaccurate metrics. Record errors are regularly introduced in real-world applications due to transcription errors, incomplete information, a lack of standard formats, etc. Such issues are discussed in the publication: "Duplicate record detection: A survey," by Elmagarmid, A. K. et at., IEEE Transactions on knowledge and data engineering, 19, no. 1, 2006, pages 1-16.

The term "fuzzy matching" refers to a technique for finding similar words using approximate string-matching to find partial pattern matches between strings when they do not exactly match. Fuzzy matching can be an effective method for identifying "fuzzy duplicates" that are seemingly distinct (i.e., not exact matches) but that represent the same string. The application of fuzzy matching can be a time- and resource-intensive task, particularly when applied to large datasets where potentially millions of strings need to be searched.

Conventional solutions to fuzzy matching may utilize the "Levenshtein Distance" to provide a measure of dissimilarity between strings. The process of determining a Levenshtein Distance involves receiving two strings as input and looping through the contents of the strings character-by-character to determine the minimum number of single-character edits (insertions, deletions, or substitutions) required to change one string into the other.

A brute-force application of the Levenshtein Distance can be used to process query strings, find possible misspellings, and/or suggest corrections from a dictionary of about 50 million words within about a half second (assuming it takes about 10 nanoseconds to compute one Levenshtein Distance pair), which may be viable for certain applications, but can be too slow for certain online search applications.

In an example bulk matching scenario in which a new dataset containing 20 million person names is to be matched to existing dataset of 100 million person names (accounting for typos) a total of two quadrillion computations would be necessary. Even with 100 processors working in parallel (and assuming a 10 nanoseconds per Levenshtein computation), the process could take 55 hours, which is much too slow. There exists a need for a more efficient and faster process for fuzzy matching, particularly for large datasets.

BRIEF SUMMARY

Some or all of the above needs may be addressed by certain implementations of the disclosed technology. Certain implementations may include systems and methods for fuzzy matching using deletion neighborhoods applied to fields of dataset records.

According to an example implementation, a method is provided for identifying duplicate and near-duplicate records in a database. The database may contain a plurality of entity representation records, each entity representation record including a unique entity identifier and a plurality of fields, each field capable of containing a field value. For each record of the plurality of entity representation records, the method includes determining a field-level deletion neighborhood for two or more field combinations of the record by: determining field hash values; creating field permutations; determining combined record hash values for each permutation; and associating each record hash value to the unique entity identifier. For each entity representation record, the method includes searching other entity representation records for matching combined record hash values indicating possible duplicate records. Certain implementations include removing, from the database, at least one of the other entity representation records having a duplicate entity identifier.

According to an example implementation, a method is provided for finding records in a database using incomplete search criteria, the database contains a plurality of entity representation records, each entity representation record including an entity identifier and a plurality of fields, each field capable of containing a field value. For each record of the plurality of entity representation records, the method includes: determining a field-level deletion neighborhood for two or more field combinations of the record by: determining field hash values; creating field permutations; determining combined record hash values for each permutation; and associating each record hash value to the entity identifier. For each entity representation record, the method includes searching other entity representation records for matching combined record hash values; and assigning the unique entity identifier to the other entity representation records having the matching combined record hash values.

According to an example implementation, a system is provided. The system includes a database containing a plurality of entity representation records, each entity representation record including a unique entity identifier and a plurality of fields, each field capable of containing a field value; one or more processors; and memory in communication with the one or more processors and storing instructions that, when executed by the one or more processors, cause the system to: for each record of the plurality of entity representation records, determine a field-level deletion neighborhood for two or more field combinations of the record, the field-level deletion neighborhood is determined by: computing field hash values; creating field permutations; computing combined record hash values for each permutation; and associating each record hash value to the unique entity identifier. For each entity representation record: searching other entity representation records for matching combined record hash values indicating possible duplicate records. Certain implementations include removing, from the database, at least one of the other entity representation records having a duplicate entity identifier.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 2A illustrates a string-level deletion neighborhood hash value creation, that may be extended to the field-level, according to certain example implementation of the disclosed technology.

FIG. 4 is a table listing experimental processing speed improvements using the deletion neighborhood concepts, according to example implementations of the disclosed technology.

DETAILED DESCRIPTION

The disclosed technology generally relates to dataset search and/or deduplication, and more particularly, to systems and methods that improve the speed and efficiency of dataset record search and/or deduplication over traditional methods. Certain implementations apply deletion neighborhood processing to ordered field permutations of dataset records encoded with hash values. The disclosed technology can significantly reduce the candidate pool size for matching records by extending traditional character- and word-level techniques to multi-field- and record-level fuzzy matching, which can provide certain technical benefits and advantages such as increased speed and reduced runtime.

Certain implementations of the disclosed technology utilize field-level deletion neighborhoods, field group combinations, hashing of individual field groups, and/or hashing of combined field groups. The general concept of deletion neighborhoods, as applied to the character-level edit distance of words in dictionaries, is discussed in "Fast similarity search in large dictionaries," Bocek, Thomas, et al., University, 2007; and in "Improved fast similarity search in dictionaries," Karch, Daniel, et al., International Symposium on String Processing and Information Retrieval. Springer, Berlin, Heidelberg, 2010.

Certain implementations of the disclosed technology will be described more fully hereinafter with reference to the accompanying drawings. This disclosed technology may, however, be embodied in many different forms and should not be construed as limited to the implementations set forth herein.

Figure 1:
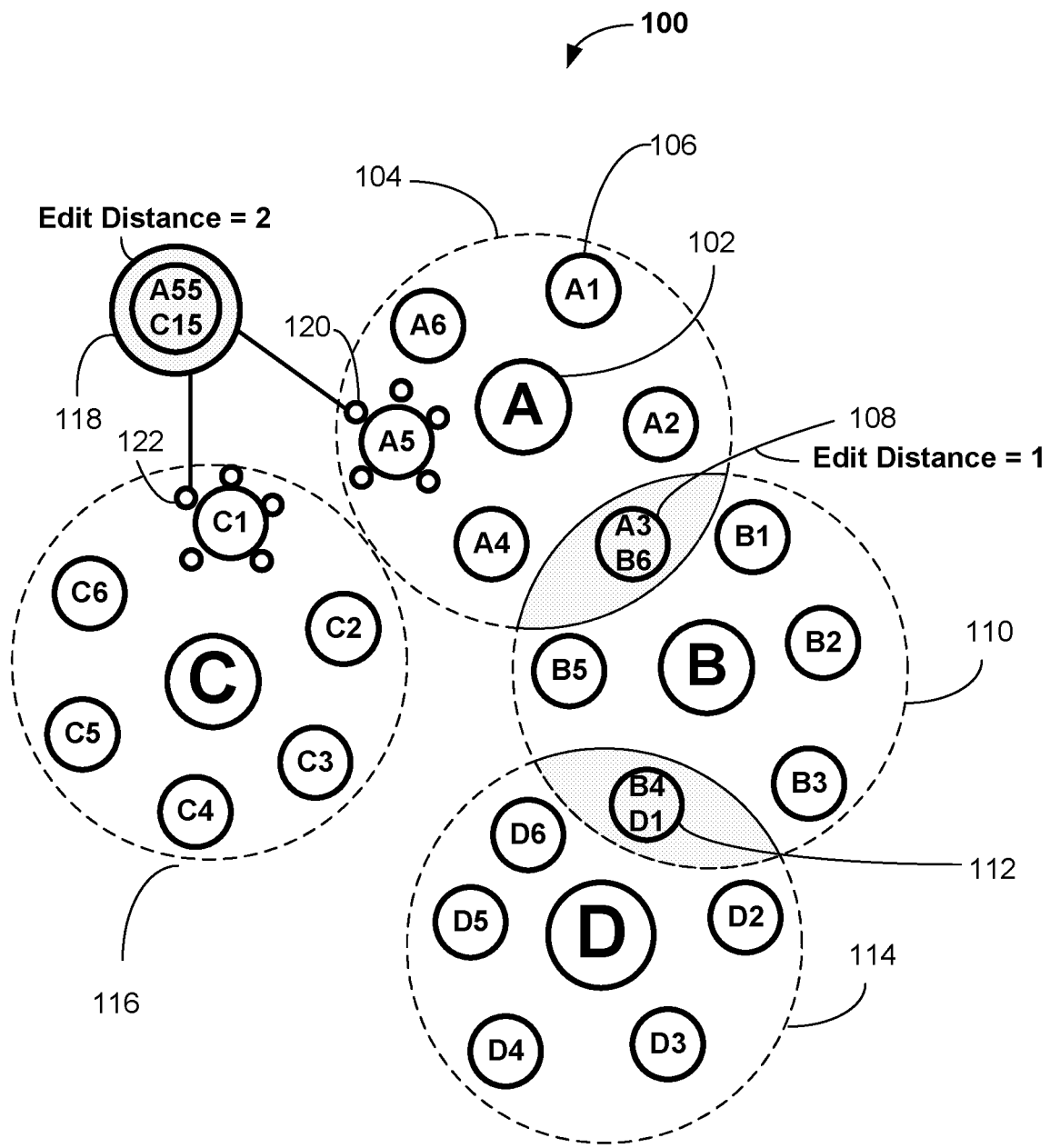
FIG. 1 is an example graphical representation of record fuzzy matching utilizing field-level deletion neighborhoods for search and/or deduplication, according to an example implementation of the disclosed technology.

FIG. 1 is an example graphical representation 100 of record fuzzy matching that utilizes field-level deletion neighborhoods for search and/or deduplication, according to an example implementation of the disclosed technology. For simplicity, this example shows a representation of four database records (labeled A, B, C, D), each having a plurality of associated fields. By way of an example, a first entity record may be represented by a unique entity identifier "A" 102, and the record may include associated fields with designators such as: First Name, Last Name, Address Number, Address Street, Phone Number, City, and Zip code. The other records of the database (B, C, and D) may include the same fields and fields designators and may be populated with field entries corresponding to the particular entity.

A deletion neighborhood 104 corresponding to the first entity A 102 may be created by sequentially "deleting" field entries then combining the remaining field entries to form different variations of the record, each having certain fields or field combinations de-emphasized. This process essentially enables finding records that match without requiring all field values to match exactly. The full record for entity A 102, for example, may include field entries for each of the associated fields, such as John, Smith, 123, Main Street, 123456789, Dallas, 75001, while the first entry A1 106 in the deletion neighborhood 104 for entity A 102 may omit the first name (Smith, 123, Main Street, 123456789, Dallas, 75001). The second entry A2 in the deletion neighborhood 104 for entity A 102 may omit the last name (John, 123, Main Street, 123456789, Dallas, 75001), and so forth for each deletion neighborhood 110, 114, 116 corresponding to the other entities B, C, and D.

As will be discussed below, a field hash value may be computed for each field value, and each entry or member (e.g., A1, A2, A3, A4, A5, A6) of the corresponding deletion neighborhood (e.g., 104) may be represented by a combined hash value of the remaining ordered field values.

Once the deletion neighborhoods 104, 110, 114, 116 are determined for the corresponding entities, (A, B, C, D), the database can be searched for partially matching records in the other deletion neighborhoods. For example, the graphical representation 100 of FIG. 1 depicts a scenario where the third member A3 108 of the deletion neighborhood 104 of entity A 102 matches with the sixth member B6 108 of the deletion neighborhood 110 of the entity B. Additionally, as depicted, the graphical representation 100 of FIG. 1, the fourth member B4 112 of the deletion neighborhood 110 of entity B matches with the first member D1 112 of the deletion neighborhood 114 of the entity D. In this example, the entity A 102 differs from entity B by a field edit distance of 1, and entity D differs from entity B by a field edit distance of 1.

According to certain example implementations of the disclosed technology, the deletion neighborhood process can be further applied to suppress additional fields to enable matches to be found for records having edit distances greater than 1. This scenario is represented in the double circle representation 118 in which sub-member A55 120 of a deletion neighborhood based on member A5 of the first deletion neighborhood 104 matches sub-member C15 122 of a deletion neighborhood based on member C1 of the fourth deletion neighborhood 116. In this example scenario, A55 120 may match C15 122 with a field edit distance of 2, meaning that all but up to two fields match in the records corresponding to entity A and C. In certain aspects, the "edit distance" in relation to deletion neighborhoods, can be considered a "maximum edit distance" for the purpose of creating the entries for the neighborhood. For example, when edit distance=1, entries may be generated where edit distance=0 or 1; when edit distance=2, entries may be generated where edit distance=0, 1, and 2. An edit distance=0 implies an exact match case. Thus, when edit distance=2, entities can match (or may be considered to be in the neighborhood) when up to 2 fields mismatch. In accordance with certain example implementations of the disclosed technology, various levels of deletion neighborhoods may be utilized to enhance the performance of the fuzzy matching process. Certain implementations may utilize field-level deletion neighborhood(s), field value-level deletion neighborhood(s), and/or a combination thereof.

Figure 2B:
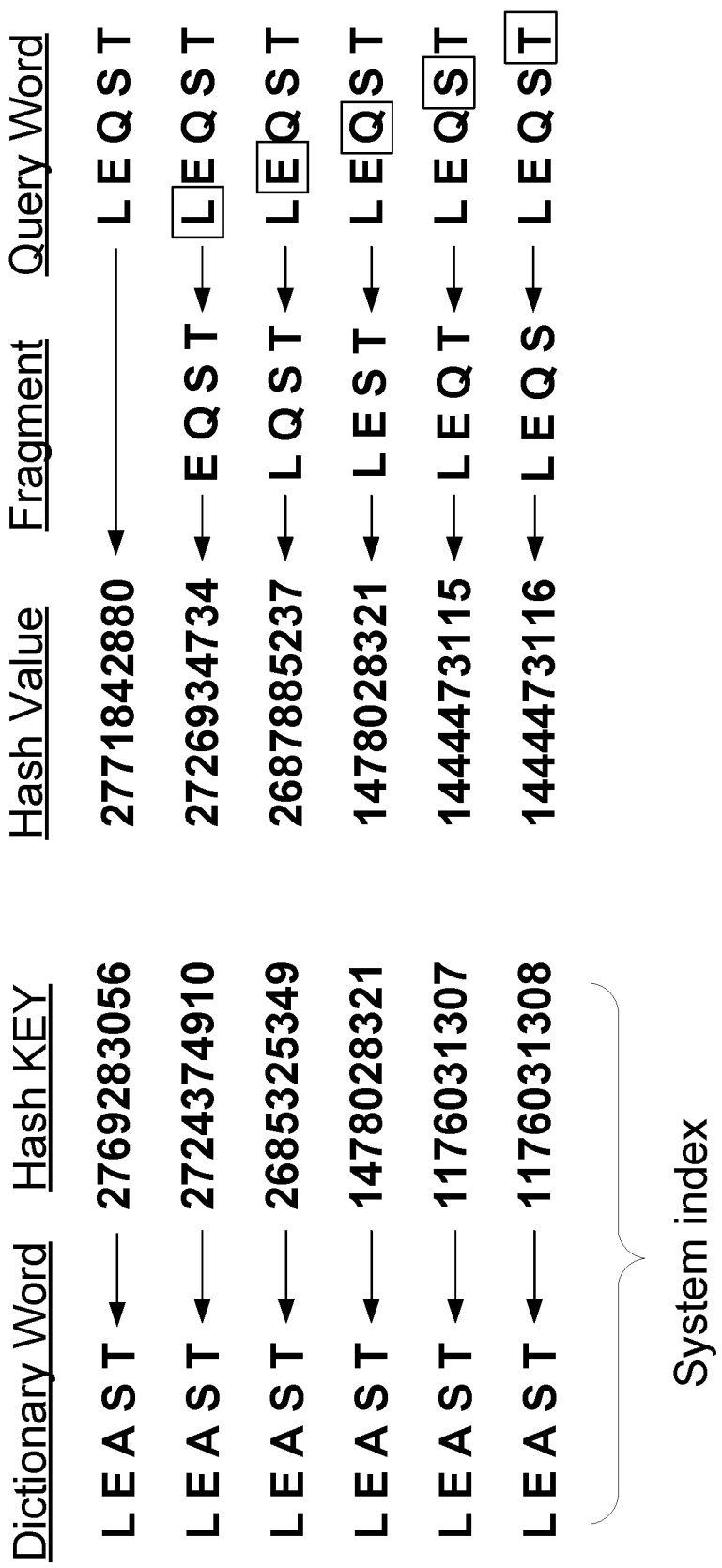
FIG. 2B illustrates hash keys generated and indexed for a single word using deletion neighborhood applied at the string-level, and that may be extended to the field-level deletion neighborhood, according to certain example implementation of the disclosed technology.
Figure 2C:
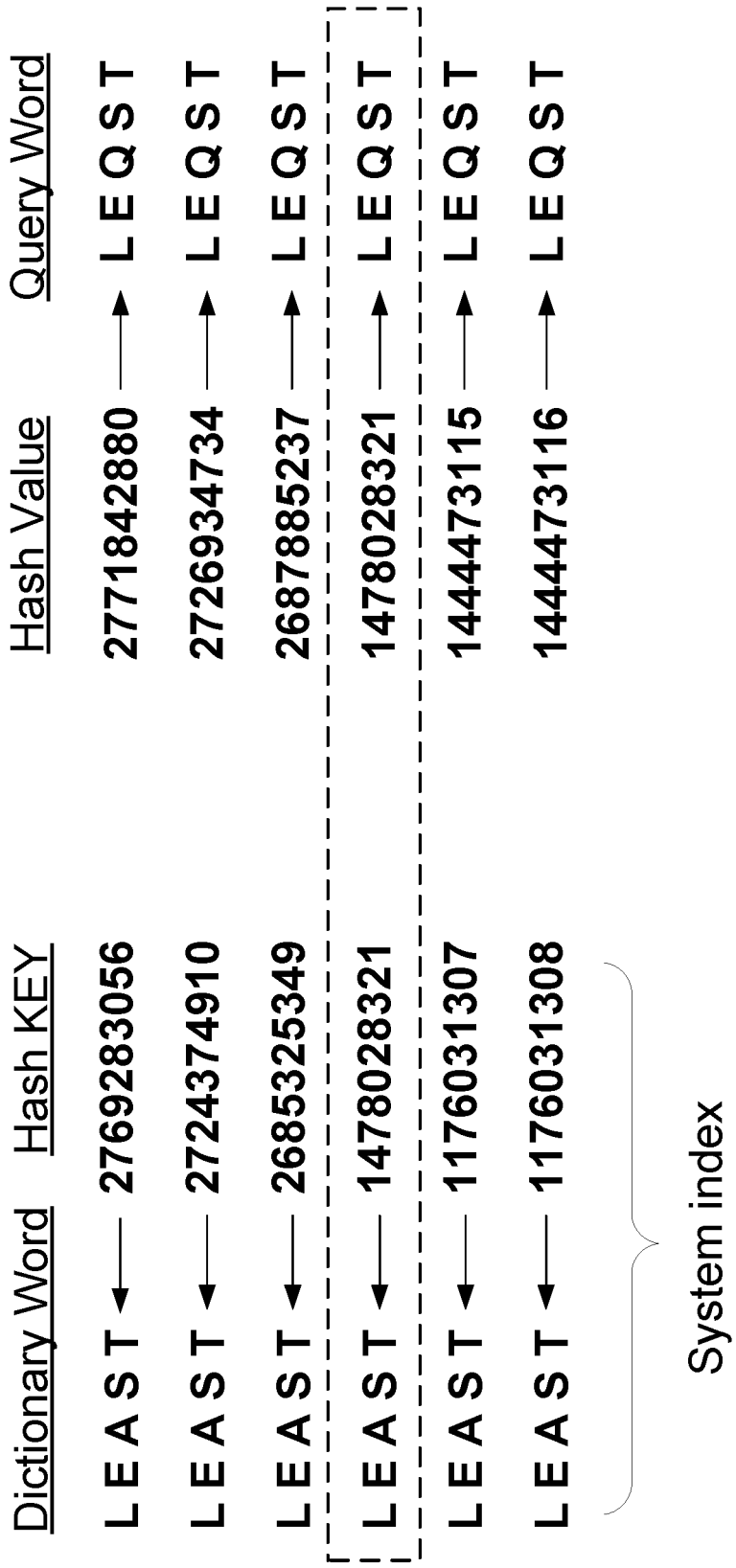
FIG. 2C illustrates the use of hash keys to find matches, according to certain example implementation of the disclosed technology.
Figures 3A, 3B:
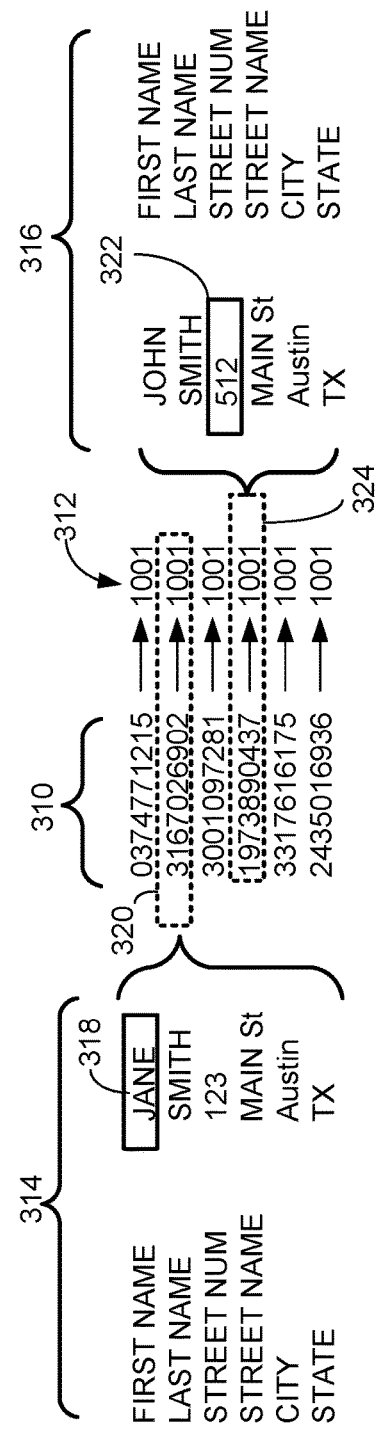
FIG. 3A illustrates hash keys generated and indexed for a permutations of combined record fields using deletion neighborhood applied at the field-level, according to certain example implementation of the disclosed technology.
FIG. 3B illustrates fuzzy matching of two separate records using field-level deletion neighborhood concepts, according to certain example implementation of the disclosed technology.
Figure 3C:
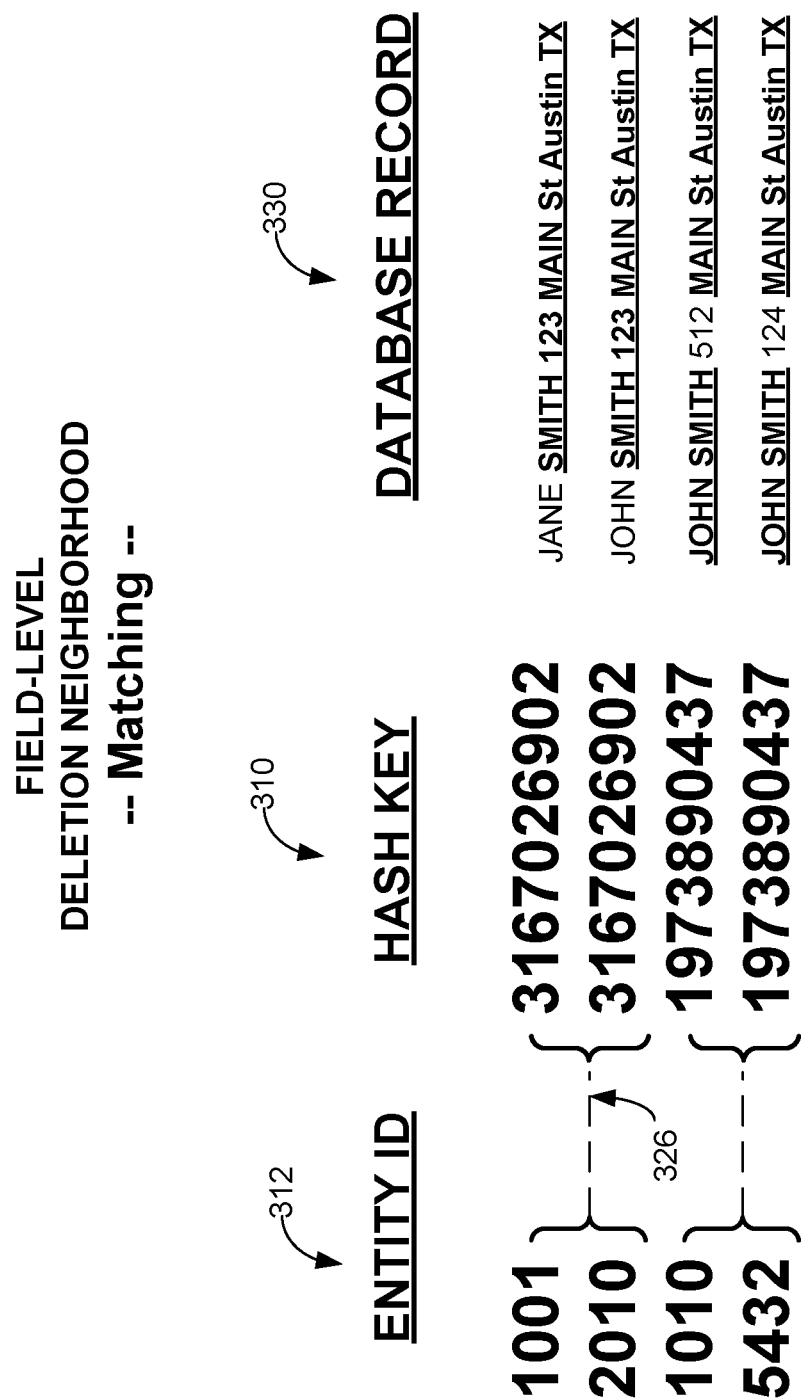
FIG. 3C illustrates associating entity IDs for separate records having matching hash values using field-level deletion neighborhood concepts, according to certain example implementation of the disclosed technology.

FIGS. 2A, 2B, and 2C will now be discussed to illustrate the concepts of the deletion neighborhood and hash values applied at the string level (or field value-level). FIGS. 3A, 3B, and 3C will be used to illustrate the application of the deletion neighborhood concepts and hashing to the field level, in accordance with certain example implementations of the disclosed technology.

FIG. 2A depicts a creation of a deletion neighborhood (with edit distance=1) and associated hash values corresponding to a dictionary word "LEAST" and the associated fragments of the word that are created by sequentially deleting one letter at a time. In this example, a hash function takes the dictionary word and its fragments as key inputs and produces corresponding hash values as output. In certain example implementations, the hash function may convert variable length input keys into fixed length hash values. Various hash functions and the uses thereof are discussed in Wang, et al., "Hashing for Similarity Search: A Survey," 2014, 1408.2927, arXiv.

FIG. 2B depicts an example of query processing, including the creation of a system index where each of the hash values (computed with reference to FIG. 2A) are used as hash keys and assigned to the same dictionary word "LEAST." When a user attempts to use a keyboard to enter the word "LEAST" for a query, it is quite easy to mistakenly hit the "Q" key instead of the "A" key on a QWERTY keyboard due to the proximity of these keys. In this example, such a common typing mistake (with an edit distance of 1) may be compensated for by determining a corresponding deletion neighborhood for the word "LEQST." FIG. 2B depicts the creation of a deletion neighborhood for "LEQST" and it fragments, including the generation of associated hash values. In certain implementations, a query's deletion neighborhood may be computed at runtime, then joined against a pre-built system index.

FIG. 2C depicts a match between a hash value for the fragment of "LEQST" in which the "Q" character is suppressed, and a hash key for the fragment of "LEAST" in which the "A" character is suppressed, which enables finding a match of the hash values that correspond to the remaining characters "LE_ST." The examples depicted in FIG. 2A-2C correspond to a Levenshtein distance of 1, which is the minimum number of single-character edits (insertions, deletions, or substitutions) required to change one word into another. In deletion neighborhood searching (i.e., matching the hash values) a list of candidates may be produced that can then be verified. In the example case where edit distance=1 and the dictionary contains the word "skit," a query word of "kits" will match with edit distance=1 on the fragment "kit." However, using an insert/delete/substitute rule, the two words would be considered to have an edit distance=2.

Some of the general concepts of string-level deletion neighborhood generation, as depicted and discussed with reference to FIGS. 2A-C, may be utilized in understanding the novel extension to the process of field-level deletion neighborhood generation, as will now be discussed with reference to FIGS. 3A-C. In the string-level deletion neighborhood generation, the following concepts may apply: (1) a single word may be considered as an item of information; (2) a word is composed of ordered characters; (3) a character is a code value; and (4) an operation that combines characters into a word is a left-to-right concatenation. In contrast, the following concepts may apply to field-level deletion neighborhood generation: (1) a single record in a dataset may be considered as an item of information; (2) a record is composed of ordered field values; (3) a code value is a hash value of a field value; and (4) an operation that combines code values is a left-to-right hashing of hashed field values.

FIG. 3A is an example table 302 depicting field-level deletion neighborhood hash value entries 306 and field combination hash keys 310 that may be created from a database record 304 having a plurality of fields (e.g., First Name, Last Name, Street Num, Street Name, City+State) populated with field values (e.g., John, Smith, 123, Main St., Austin+Texas) in accordance with an example implementations of the disclosed technology. For clarity, FIG. 3A also depicts each of the field permutations 308 used in computing the field combination hash keys 310. The database record 304 may be associated with an entity identifier ID 312, which in certain implementations, may also be associated with the field combination hash keys 310, as will be discussed below with reference to FIG. 3B.

In certain example implementations, requiring city/state/zip code information in the deletion neighborhood generation may improve the accuracy of the search. In some implementations, certain fields may be combined to further improve the search by providing context to the search. The process of combining fields may also provide the benefit of reducing memory requirements to store the generated records. FIG. 3A illustrates the process of combining certain fields (such as City+State) before computing the field hash value entries 306, which may then be used to compute the field combination hash keys 310. In certain implementations, the street name (e.g., MAIN) and the street name suffix (e.g., St) may be similarly combined before computing the field hash value entries.

FIG. 3B illustrates fuzzy matching a first separate record 314 and a second separate record 316 to the database record 304 as shown and discussed above with reference to FIG. 3A using field-level deletion neighborhood concepts, according to certain example implementation of the disclosed technology. In this example, a field-level deletion neighborhood is generated for the first separate record 314, and a resulting field combination hash key 320 (generated by deletion of the "First Name" field entry 318) matches a generated field combination hash key 310 corresponding to the database record 304. Given the match, the ID 312 corresponding to the database record 304 may be associated with the first separate record 314. In certain example implementations, a field edit distance (1 in this case) may also be associated with the connection between the database record 304 and the first separate record 314 since all but one of the fields match.

FIG. 3B also depicts a field combination hash key 320 (generated by deletion of the "Street Num" field entry 332 in the second separate record 316) that matches a generated field combination hash key 324 corresponding to the database record 304. Given the match, the ID 312 corresponding to the database record 304 may also be associated with the second separate record 316. In certain example implementations, a field edit distance (1 in this case) may also be associated with the connection between the database record 304 and the second separate record 316 since all but one of the fields match.

FIG. 3C summarizes the results of the fuzzy record matching example discussed with reference to FIG. 3A and FIG. 3B. According to an example implementation, entity IDs 312 may be linked 326 for those database records 330 having matching field combination hash keys 310.

FIG. 4 is a table 400 listing experimental processing speed improvements using the deletion neighborhood concepts for single searches and bulk matching compared with brute-force methods. Significant advantages in processing speed may be realized with the disclosed technology, particularly when applied to large datasets. For example, processing time may be reduced by a factor of 388 (over force matching) for bulk matching 73,000 search fields in a dataset containing 370,000 records utilizing embodiments of the disclosed technology.

In accordance with certain example implementations of the disclosed technology, various levels (record-level, field-level, field value-level, string-level etc.) of deletion neighborhoods may be utilized in the process of fuzzy matching for search and/or deduplication. And as illustrated in FIG. 1, the fuzzy matching techniques disclosed herein may be applied to find fuzzy matches with edit distances (character, string, field, etc.) of any value. In certain example implementations, it may be preferred to limit the edit distance calculations to 5 or less, for example, to reduce false positive matches and/or to limit the resulting memory requirements to store the results. Certain example implementations of the disclosed technology may utilize other types of neighborhoods besides or in addition to deletion neighborhoods, including but not limited to fumble-finger neighborhoods, character transposition neighborhoods, alternate representation neighborhoods. A fumble-finger neighborhood, for example, may be constructed using versions of field values that are common typographical errors. A character transposition neighborhood, for example, may be constructed using versions of field values with adjacent characters transposed. An alternate representation neighborhood, for example, may be constructed using versions of field values with synonyms, nicknames, Soundex, and/or Metaphonic representations.

The number of records N that may be generated in the process of generating field-level deletion neighborhoods may be estimated according to the formula:

$$N = m\left(\sum_{r=1}^{a} \frac{n!}{r!(n-r)!}\right),$$

where n=the total number of field groups, r=the edit distance, a=the maximum edit distance, and m=the number of records. If deletion neighborhoods are also generated at the string-level, the value n is the average length of the field values. If string-level deletion neighborhoods are also computed, the calculation above would be performed for every field that is expanded with string-level deletion neighborhoods and, at each step, the previous N result becomes the m for the next calculation. As an example using only field-level deletion neighborhoods, a dataset having a number of records m=363.8 million with 5 field groups would expand to approximately 2.2 billion records upon creating a deletion neighborhood for five field groups with an edit distance of 1. In this example, the result of the deletion neighborhood creation (in which an entity ID can be converted to a hash value, and a hash value can be converted to an entity ID), the size of each the two data indexes for this example would be about 31 GB in size, with a total size of the indexes approximately 62 GB. This example is representative of the approximate size of data that may be generated using a public record header file with fully populated names, SSN, and addresses. Example case examples are discussed at the end of this document. The index size values discussed above were determined experimentally using HPCC Systems technology; other technologies may produce different results.

The disclosed technology may enable fuzzy deduplication of a dataset (such as a public records header) that was previously unachievable on certain computing platforms due to the size and complexity of the data. Certain example implementations of the disclosed technology may be enabled by the use of special purpose HPCC Systems in combination with special purpose software. HPCC Systems, for example, are developed and offered by LexisNexis Risk Solutions, Inc., the assignee of the disclosed technology and provide data-intensive supercomputing platform(s) designed for solving big data problems. Certain software modules, in conjunction with the HPCC Systems, provide technical improvements in computer processing that enable the disclosed technology and provide useful, tangible results that may have previously been unattainable. For example, certain example implementation of the disclosed technology may process massive data sets, which are computationally intensive, requiring special software and hardware.

One of the issues that has plagued previous "relationship determination" solutions involving massive data sets is the extremely long run-times and large amount of memory/disk space required. One of the technical solutions provided by the technology disclosed herein concerns the enablement and efficiency improvement of computer systems and software to process relationship data, and to provide the desired data in a reasonable amount of time.

Determining relationships among records, for example, can follow the classical n-squared process for both time and disk space. According to an example implementation of the disclosed technology, light-weight self-joins may be utilized, for example, in generating Enterprise Control Language (ECL). But disk-space utilization might still be high. Certain example implementations of the disclosed technology may enable a core join to be split into parts, each of which is persisted. This has the advantage of breaking a potentially very long join into n parts while allowing others a time slice. This has an effect of reducing disk consumption by a factor of n, provided the eventual links are fairly sparse. In terms of performance, it should be noted that if n can be made high enough that the output of each join does not spill to disk, the relationship calculation process may have significantly faster performance.

In accordance with certain example implementations, deduplication records may be performed by certain additional special programming and analysis software. For example, record linking fits into a general class of data processing known as data integration, which can be defined as the problem of combining information from multiple heterogeneous data sources. Data integration can include data preparation steps such as parsing, profiling, cleansing, normalization, and parsing and standardization of the raw input data prior to record linkage to improve the quality of the input data and to make the data more consistent and comparable (these data preparation steps are sometimes referred to as ETL or extract, transform, load).

Certain example implementations of the disclosed technology may utilize data profiling and data hygiene applications to support the data preparation process. For example, a data ingest application may allow input files to be combined or merged with an existing base file. In certain implementations, unstructured data may be parsed for data preparation. The data preparation steps are usually followed by the actual record linking or clustering process. Certain implementations of the disclosed technology may utilize applications for several different types of record linking.

Data profiling, data hygiene and data source consistency checking, while key components of the record linking process, have their own value within the data integration process and may be supported for leverage even when record linking is not a necessary part of a particular data work unit. Certain example implementations may utilize specificity to determine the relevance/weight of a particular field in the scope of the linking process, and a mathematical model based on the input data, rather than the need for hand coded user rules, which may be key to the overall efficiency of the method.

Certain implementations of the disclosed technology may be structured as library function. In some implementations, automatic deduplication may be performed based on the result of the search. In other example implementations, a user may decide what to do with the results. In one exemplary implementation of the disclosed technology, a user may receive new data and may want to determine if any of the new data was already present in the database. In certain implementations, the search results may be fed into a deduplicator. According to certain exemplary implementations of the disclosed technology, the deduplicator may be configured to perform one or more of the following:

If the new data is known to be a complete refresh (i.e. all fields complete) and is highly trusted, the deduplicator may assign the found entity ID to the new data and delete the old data.

If the new data is partial but highly trusted, the old data may be merged into the new data while prioritizing new field values. If the entity ID is found in the old data, it may be added to the new data and the old data may be deleted.

If the new data is not highly trusted, the old and new data may be merged while prioritizing the old data and re-writing the old data.

In certain implementations, the merging can be performed on a field-by-field basis. For example, old and new field values may be compared, and the "better" field value may be retained. In some implementations a better field value may be based on a number of factors, including but not limited to confidence scores, specificity, etc. Examples of better fields populated by name information could include fields having the longest names for first names and/or non-nicknames. Examples of better fields populated by latitude/longitude information could include fields having the greatest decimal point accuracy. Examples of better fields populated by date information could include those fields with full date information ("17/Feb/1965") rather than partial date information ("Feb/1965").

In certain example implementations, merely identifying duplicates may be sufficient and valuable. As an example, consider the case where all records may have valid beginning and ending dates. If a duplicate is found, a detailed comparison of the data may be done. If the result shows that the records are essentially the same, the old record's end date may be updated to the current date. If the records are different enough, a new record may be created, possibly using merge rules. In some implementation, the new record can be assigned with the found entity ID, the beginning and ending dates may be updated to the current date, and the overall result may be appended to the old dataset. In this respect, record history may be preserved, and subsequent queries of the data can be made as of a certain date.

In certain example implementations, field groups may be compared instead of individual fields, particularly in cases where individual field values provide little meaning or specificity absent a connection to other field values.

Certain example implementations may return only entity IDs as results. In such implementations, the original data may not be retained at all. Thus, in certain aspects, the original data may be considered anonymized as hash codes but may still be searchable, which may provide certain advantages for applications such as HIPAA (among others) where personally identifiable information (PII) needs to be removed from data to avoid privacy issues. In this respect, a user may be required to separately fetch the original data for display, deduplication, or further use.

Figure 5:
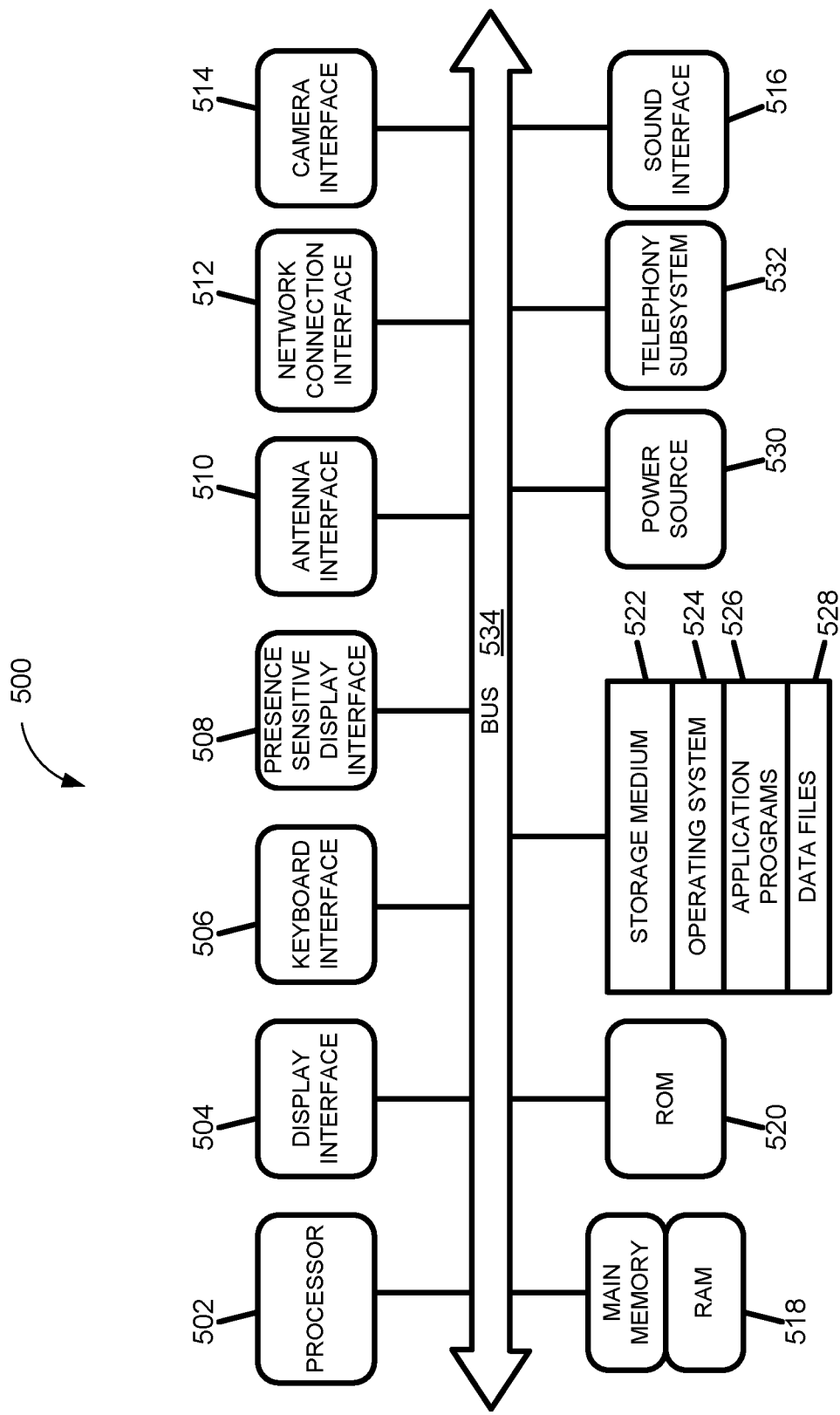
FIG. 5 is a block diagram of a computing device utilized in the system, in accordance with certain example implementations of the disclosed technology.

FIG. 5 depicts a block diagram of an illustrative computing device 500 that may be utilized for efficient record search and/or record deduplication according to an example implementation. Various implementations and methods herein may be embodied in non-transitory computer readable media for execution by a processor. It will be understood that the computing device 500 is provided for example purposes only and does not limit the scope of the various implementations of the communication systems and methods.

The computing device 500 of FIG. 5 includes one or more processors where computer instructions are processed. The computing device 500 may comprise the processor 502, or it may be combined with one or more additional components shown in FIG. 5. In some instances, a computing device may be a processor, controller, or a central processing unit (CPU). In yet other instances, a computing device may be a set of hardware components.

The computing device 500 may include a display interface 504 that acts as a communication interface and provides functions for rendering video, graphics, images, and texts on the display. In certain example implementations of the disclosed technology, the display interface 504 may be directly connected to a local display. In another example implementation, the display interface 504 may be configured for providing data, images, and other information for an external/remote display. In certain example implementations, the display interface 504 may wirelessly communicate, for example, via a Wi-Fi channel or other available network connection interface 512 to the external/remote display.

In an example implementation, the network connection interface 512 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC)

port, another like communication interface, or any combination thereof. In one example, the display interface 504 may be operatively coupled to a local display. In another example, the display interface 504 may wirelessly communicate, for example, via the network connection interface 512 such as a Wi-Fi transceiver to the external/remote display.

The computing device 500 may include a keyboard interface 506 that provides a communication interface to a keyboard. According to certain example implementations of the disclosed technology, the presence-sensitive display interface 508 may provide a communication interface to various devices such as a pointing device, a touch screen, etc.

The computing device 500 may be configured to use an input device via one or more of input/output interfaces (for example, the keyboard interface 506, the display interface 504, the presence sensitive display interface 508, network connection interface 512, camera interface 514, sound interface 516, etc.) to allow a user to capture information into the computing device 500. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 500 or may be a separate device. For example, the input device may be an accelerometer, a magnetometer, a digital camera, a microphone, and an optical sensor.

Example implementations of the computing device 500 may include an antenna interface 510 that provides a communication interface to an antenna; a network connection interface 512 that provides a communication interface to a network. According to certain example implementations, the antenna interface 510 may utilize to communicate with a Bluetooth transceiver.

In certain implementations, a camera interface 514 may be provided that acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, random-access memory (RAM) 518 is provided, where computer instructions and data may be stored in a volatile memory device for processing by the CPU 502.

According to an example implementation, the computing device 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device 500 includes a storage medium 522 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored. According to an example implementation, the computing device 500 includes a power source 530 that provides an appropriate alternating current (AC) or direct current (DC) to power components. According to an example implementation, the computing device 500 includes and a telephony subsystem 532 that allows the device 500 to transmit and receive sound over a telephone network. The constituent devices and the CPU 502 communicate with each other over a bus 534.

In accordance with an example implementation, the CPU 502 has appropriate structure to be a computer processor. In one arrangement, the computer CPU 502 may include more than one processing unit. The RAM 518 interfaces with the computer bus 534 to provide quick RAM storage to the CPU 502 during the execution of software programs such as the operating system application programs, and device drivers. More specifically, the CPU 502 loads computer-executable process steps from the storage medium 522 or other media into a field of the RAM 518 in order to execute software programs. Data may be stored in the RAM 518, where the data may be accessed by the computer CPU 502 during execution. In one example configuration, the device 500 includes at least 128 MB of RAM, and 256 MB of flash memory.

The storage medium 522 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500 or to upload data onto the device 500. A computer program product, such as one utilizing a communication system may be tangibly embodied in storage medium 522, which may comprise a machine-readable storage medium.

According to one example implementation, the term computing device, as used herein, may be a CPU, or conceptualized as a CPU (for example, the CPU 502 of FIG. 5). In this example implementation, the computing device (CPU) may be coupled, connected, and/or in communication with one or more peripheral devices.

Figure 6:
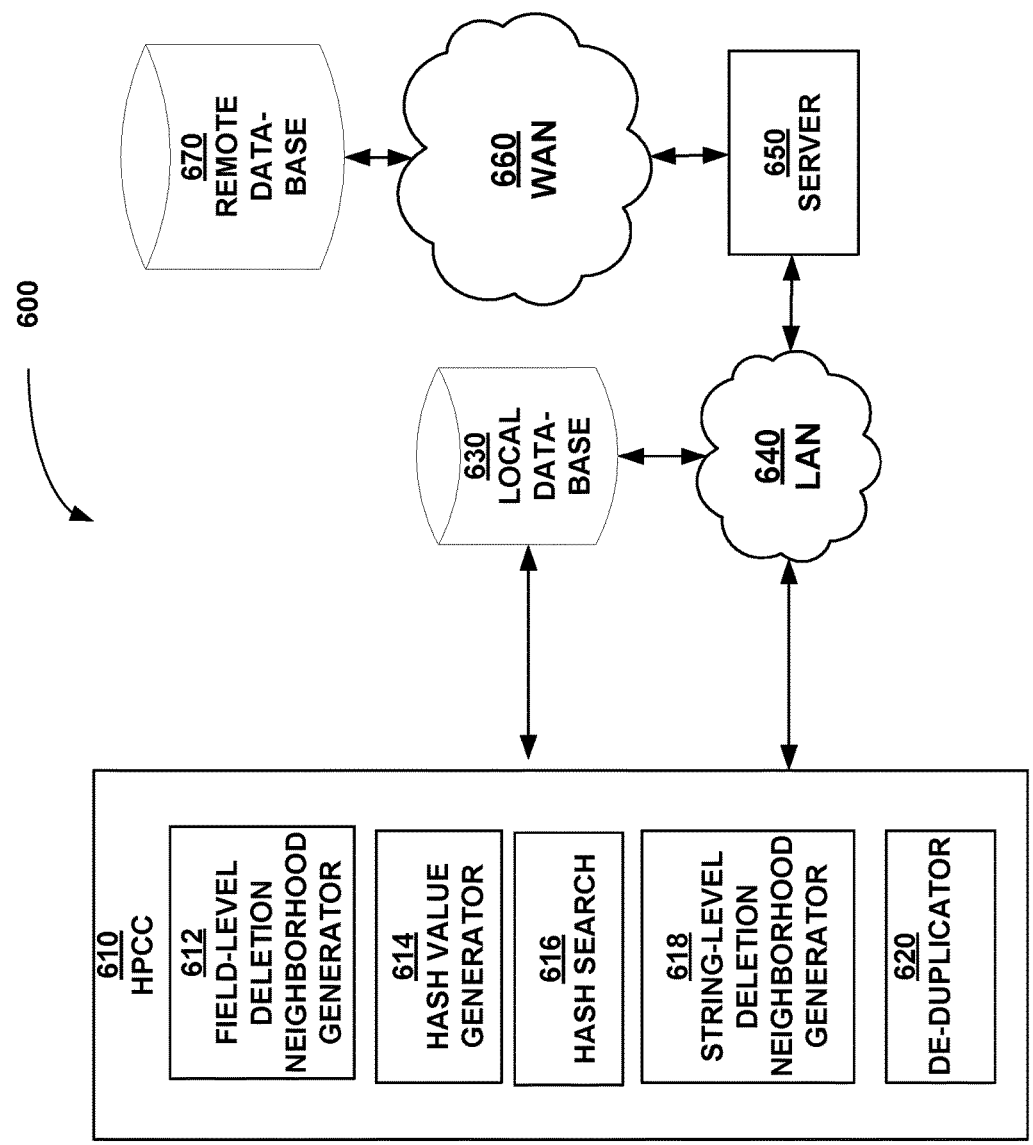
FIG. 6 is an example block diagram of a system that creates and/or utilizes field-level and/or string-level deletion neighborhoods for search and/or deduplication, according to an example implementation of the disclosed technology.

FIG. 6 is an example block diagram of a system 600 that creates and/or utilizes field-level and/or string-level deletion neighborhoods for search and/or deduplication, according to an example implementation of the disclosed technology. The system 600 may include (or be embodied as) one or more of the computing device 500 components as discussed above with reference to FIG. 6. The system 600 may be embodied as a special purpose HPCC system 610 as previously discussed, and may utilize one or more a special-purpose modules, including but not limited to: a field-level deletion neighborhood generator 612, a hash value generator 614, a hash search module 616, a string-level deletion neighborhood generator, and de-duplicator module 620.

In certain example implementations, the HPCC system 610 may be in communication with one or more local database(s) 630. In certain example implementations, the HPCC system 610 may be in communication with a server 650, for example via a local area network 640. In certain implementations, the server may be in communication to a wide area network 660 (such as the Internet) to enable remote access to the HPCC system 610. In certain implementations, one or more remote database(s) 670 may be in communication with the wide area network 670, for example, to store data and/or to retain processed data.

Figure 7:
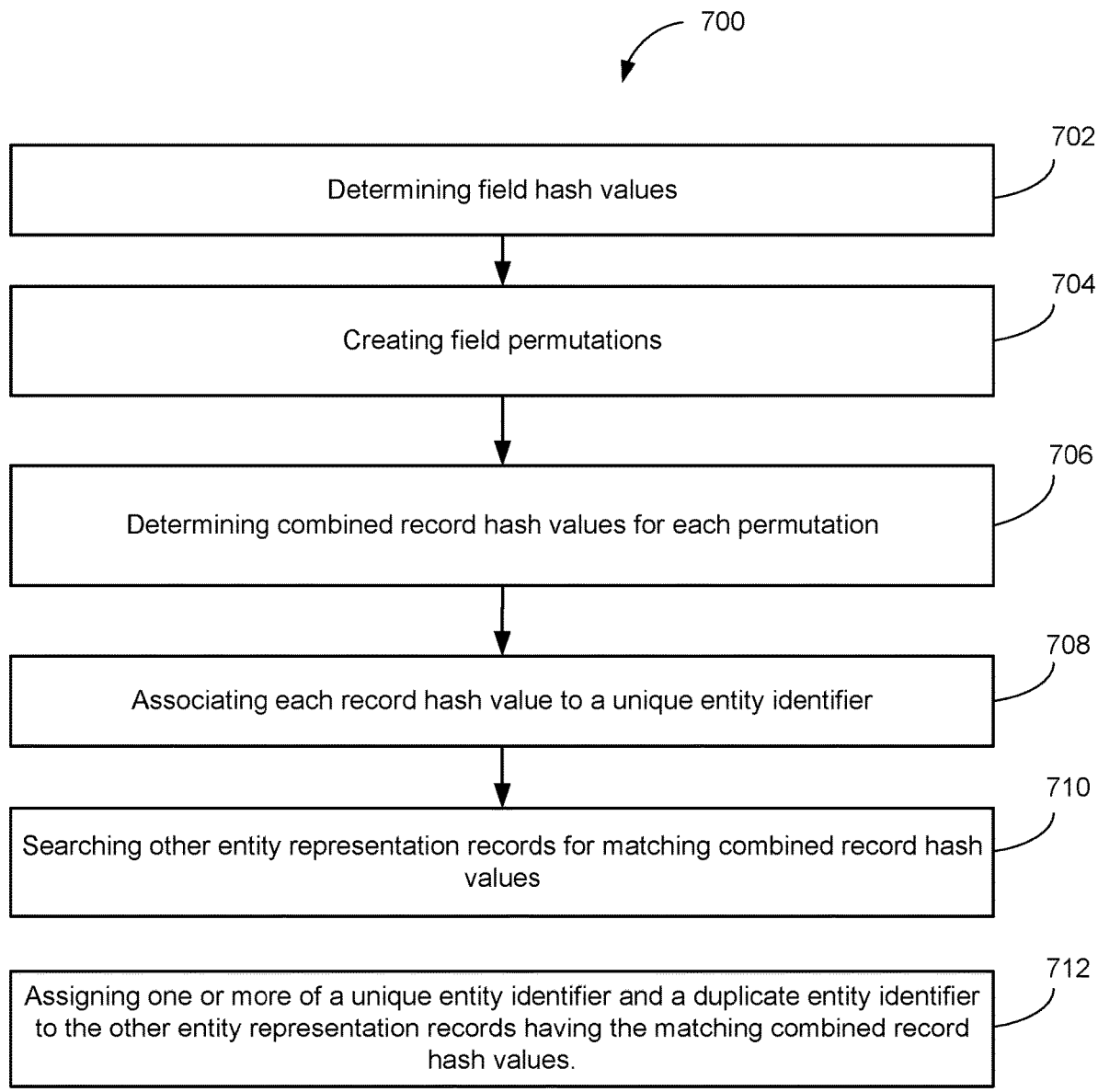
FIG. 7 is a flow diagram of certain methods for searching and/or deduplicating database records, according to an example implementation of the disclosed technology.

An example method 700 will now be described with reference to the flowchart of FIG. 7. The method may include searching for and/or de-duplicating records in a database containing a plurality of entity representation records, each entity representation record including a unique entity identifier and a plurality of fields, each field capable of containing a field value. For each record of the plurality of entity representation records, the method 700 includes determining a field-level deletion neighborhood for two or more field combinations of the record. The method 700 starts in block 702, and according to an example implementation includes determining field hash values. In block 704, the method 700 includes creating field permutations. In block 706, the method 700 includes determining combined record hash values for each permutation. In block 708, the method 700 includes associating each record hash value to the unique entity identifier. In block 710, and for each entity representation record the method 700 includes searching other entity representation records for matching combined record hash values. In block 712, the method 700 includes assigning one or more of a unique entity identifier and a duplicate entity identifier to the other entity representation records having the matching combined record hash values.

In an example implementation, the method can further include removing, from the database, at least one of the other entity representation records having the duplicate entity identifier.

The method can further include saving at least one unique field value of the removed entity representation records in a data preserving field identified by at least the unique entity identifier.

The method can further include removing, from the database, all but one representative entity representation record from records having a same assigned unique entity identifier. In certain example implementations, the representative entity representation record can include a record having a highest accuracy confidence level.

In certain example implementations, the two or more field combinations of the record can include one of more of: predetermined fields, required fields, combined fields, and ordered fields. In some implementations, the required fields can include city and state fields.

The method can further include determining a field string-level deletion neighborhood for each field value.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

Throughout the specification and the claims, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

The various aspects described herein are presented as methods, devices (or apparatus), systems, and articles of manufacture that may include a number of components, elements, members, modules, nodes, peripherals, or the like. Further, these methods, devices, systems, and articles of manufacture may include or not include additional components, elements, members, modules, nodes, peripherals, or the like.

According to one example implementation, the terms computing device, as used herein, may be a CPU, or conceptualized as a CPU (for example, the CPU 502 of FIG. 5). In certain example implementations, the computing device (CPU) may be coupled, connected, and/or in communication with one or more peripheral devices. In another example implementation, the term computing device, as used herein, may refer to a handheld computer, desktop computer, laptop computer, tablet computer, or some other like terminology. In an example embodiment, the mobile computing device may output content to its local display and/or speaker(s).

Furthermore, the various aspects described herein may be implemented using special-purpose programming or engineering techniques to produce software, firmware, hardware, or any combination thereof to control a computing device to implement the disclosed subject matter. The term "system" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

One or more network interfaces may facilitate connection of the computing device 500 inputs and outputs to one or more suitable networks and/or connections. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the computing device 500 with more or less of the components illustrated in FIG. 5.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Use Case 1

Fuzzy Deduplication

The disclosed technology may be utilized to deduplicate records in a large dataset, where each record is identified by a unique entity ID, but where some of the records have nearly identical data. The dataset, for example, may be a public records header with about 500 million records populated with names, SSNs, addresses, etc. In this example, certain fields may be considered (such as: first name, last name, SSN, street address number+street address name, city name+zip code). Certain fields, such as the street address number and the street address name, may be combined into a single field group (as indicated by the "+"), particularly when no appreciable benefit in processing speed, memory utilization, and/or accuracy is gained by separately generating deletion neighborhoods for such fields. Furthermore, certain fields (such as the first name) may be expanded with an edit distance=1 to account for misspellings, etc.

In accordance with certain implementations of the disclosed technology, a first pair of ID indexes may be generated, for example, to keep track of the generated deletion neighborhoods and the associated records.

To further help eliminate self-join scenarios and/or to avoid unnecessarily producing additional records, certain implementation may include creating another pair of system indexes based on information supplied from the first pair of ID indexes. This process may include finding initial matches (via hash codes), creating entity groups with those initial matches, identifying the initial matches with a new unique ID, and recursively remapping that new ID to its lowest value.

Experimental results using the techniques disclosed herein on a public records header containing 453,705,083 records found 34.7 million clusters of near duplicates, with clusters ranging in size from 2 to 1157. It was determined that less than 1% of the clusters included false positive (i.e., records incorrectly designated as duplicate). By completely deduplicating (resolving) the clusters, approximately 45 million duplicate records could be removed from the public records header.

Use Case 2

Fuzzy Form Search

The disclosed technology may be utilized for increasing processing speeds related to form searching. In this use case, a user may fill-out one or more fields of a search form to find matching records (base data) in a database. The data entered by the user may be converted to a single record dataset that matches the format of the records of the base data. A deletion neighborhood may then be created from the (converted) user search data using the same rules used to create deletion neighborhoods for the base data. Misspellings or other mistakes in both the search form and the base data may be compensated by enabling/specifying string-level edit distance. In this example use case, it is not a requirement that the user fill out all fields because the field-level deletion neighborhood edit distance can be adjusted to compensate for missing entries.

As an example, a public records header may be searched to find matching (or near matching records). The header may include five fields (e.g., First Name, Last Name, Phone Number, Street Address, City) and a user may be required to enter two or more of five presented search fields corresponding to the fields of the header. In this case, the field-level maximum edit distance would be 5−2=3. As in the previous use case, deletion neighborhood indexes may be used to rollup records based on hash values, join each ID with the hash index, and join the hash with the ID index to resolve cases such as: A is related to B, B is related to C, therefore A is related to C. Once the deletion neighborhood is created, search code may be the same no matter how many fields are involved.

I claim:

1. A method of identifying and de-duplicating records in a database containing a plurality of entity representation records, each entity representation record including a unique record identifier and a plurality of fields, each field capable of containing a field value, the method comprising:
for each record of the plurality of entity representation records, determining a field-level deletion neighborhood for two or more field combinations of the record and for each field value, the determining the field-level deletion neighborhood comprising:
determining field hash values;
creating field permutations;
omitting at least one field for each permutation of the field permutations;
determining combined record hash values for each permutation;
associating each record hash value to a unique entity identifier;
wherein determining the field-level deletion neighborhood comprises determining one or more field string fragments;
for each entity representation record;
searching other entity representation records for matching combined record hash values; and
assigning one or more of a unique entity identifier and a duplicate entity identifier to the other entity representation records having matching combined record hash values.

2. The method of claim 1, further comprising removing, from the database, at least one of the other entity representation records having the duplicate entity identifier.

3. The method of claim 2, further comprising saving at least one unique field value of removed entity representation records in a data preserving field identified by at least the unique entity identifier.

4. The method of claim 1, further comprising removing, from the database, all but one representative entity representation record from records having a same assigned unique entity identifier.

5. The method of claim 4, wherein the representative entity representation record comprises a record having a highest accuracy confidence level.

6. The method of claim 1, wherein the two or more field combinations of the record comprise one of more of: predetermined fields, required fields, combined fields, and ordered fields.

7. The method of claim 6, wherein the required fields include city and state fields.

8. The method of claim 1, further comprising determining a field string-level deletion neighborhood for each field value.

9. A deduplication system, comprising:
a database containing a plurality of entity representation records, each entity representation record including a unique entity identifier and a plurality of fields, each field capable of containing a field value;
one or more processors; and
memory in communication with the one or more processors and storing instructions that, when executed by the one or more processors, cause the system to:
for each record of the plurality of entity representation records, determine a field-level deletion neighborhood for two or more field combinations of the record and for each field value, the field-level deletion neighborhood is determined by:
computing field hash values;
creating field permutations;
omitting at least one field for each permutation of the field permutations;
computing combined record hash values for each permutation;
associating each record hash value to the unique entity identifier;
wherein determining the field-level deletion neighborhood comprises determining one or more field string fragments;
for each entity representation record;
searching other entity representation records for matching combined record hash values; and
assigning a duplicate entity identifier to the other entity representation records having the matching combined record hash values.

10. The deduplication system of claim 9, wherein the instructions further cause the system to remove, from the database, at least one of the other entity representation records having a duplicate entity identifier.

11. The deduplication system of claim 10, wherein the instructions further cause the system to save at least one unique field value of removed entity representation records in a data preserving field identified by at least the unique entity identifier.

12. The deduplication system of claim 9, wherein the instructions further cause the system to assign the unique entity identifier to the other entity representation records having the matching combined record hash values.

13. The deduplication system of claim 9, wherein the two or more field combinations of the record comprise one or more of: predetermined fields, required fields, combined fields, and ordered fields.

14. The deduplication system of claim 9, wherein the two or more field combinations of the record comprise required fields that include city and state fields.

15. A method of finding records in a database using incomplete search criteria, the database containing a plurality of entity representation records, each entity representation record including a unique entity identifier and a plurality of fields, each field capable of containing a field value, the method comprising:

for each record of the plurality of entity representation records, determining a field-level deletion neighborhood for two or more field combinations of the record and for each field value, the determining the field-level deletion neighborhood comprises:
determining field hash values;
creating field permutations;
omitting at least one field for each permutation of the field permutations;
determining combined record hash values for each permutation;
associating each record hash value to the unique entity identifier;
for each entity representation record;
wherein determining the field-level deletion neighborhood comprises determining one or more field string fragments;
searching other entity representation records for matching combined record hash values; and
assigning the unique entity identifier to the other entity representation records having matching combined record hash values.

16. The method of claim 15, wherein the two or more field combinations of the record include one or more of: predetermined fields, required fields, combined fields, and ordered fields.

* * * * *